No. 838,581. PATENTED DEC. 18, 1906.
E. PROUTY.
POWER TRANSMITTING MACHINE.
APPLICATION FILED AUG. 19, 1904.

2 SHEETS—SHEET 1.

WITNESSES:
R. E. Hamilton.
M. L. Lange.

INVENTOR
Enoch Prouty.
By, Higdon & Higdon,
Attys.

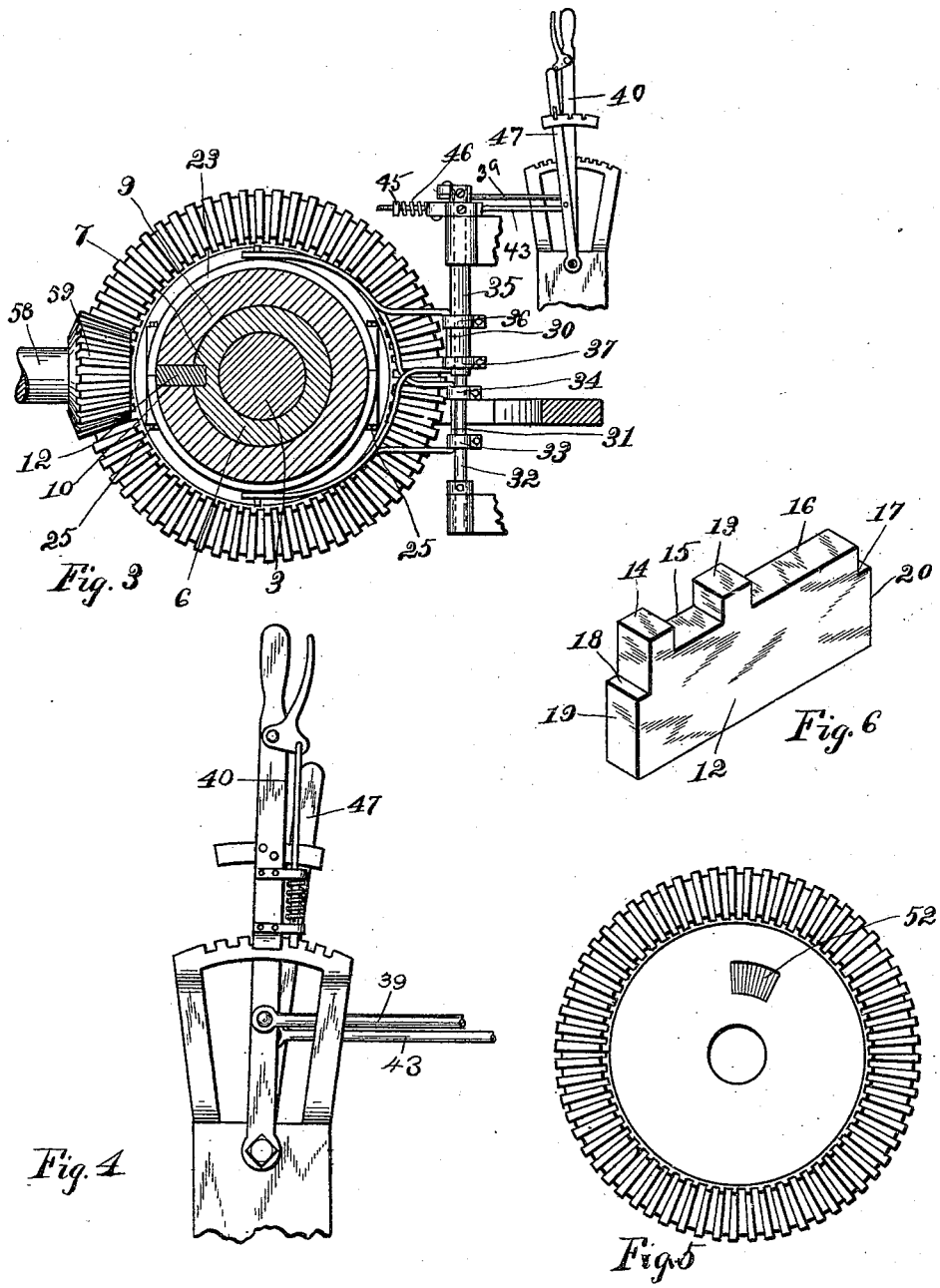

UNITED STATES PATENT OFFICE.

ENOCH PROUTY, OF KANSAS CITY, KANSAS.

POWER-TRANSMITTING MACHINE.

No. 838,581.   Specification of Letters Patent.   Patented Dec. 18, 1906.

Application filed August 19, 1904. Serial No. 221,316.

*To all whom it may concern:*

Be it known that I, ENOCH PROUTY, a citizen of the United States, residing at Kansas City, in the county of Wyandotte and State of Kansas, have invented new and useful Improvements in Power-Transmitting Machines, of which the following is a specification.

My invention relates to power-transmitting machines; and the first object of my invention is to transmit power or force from a fixed given source by means of a power-transmitting shaft to another shaft or a plurality of shafts directly or indirectly by the transmitting-shaft; and a second object that I have in view in producing such a machine is to provide a means for the transmission of power from a power-transmitting shaft which can be easily applied to locomotives, engines, automobiles, cycle-motors, and other vehicles of transportation; and a third object that I have in view in producing a power-transmitting machine of the character named is to reverse the movement of the shafts or machinery driven by the direct-driving shaft without reversing the motion of the power-transmitting shaft; and a fourth object that I have borne in mind in the production of this machine is its simplicity of construction with a view to render it easy of manipulation and reliable in operation, and, further, to produce a machine of the kind that is susceptible of long durability.

Figure 2:
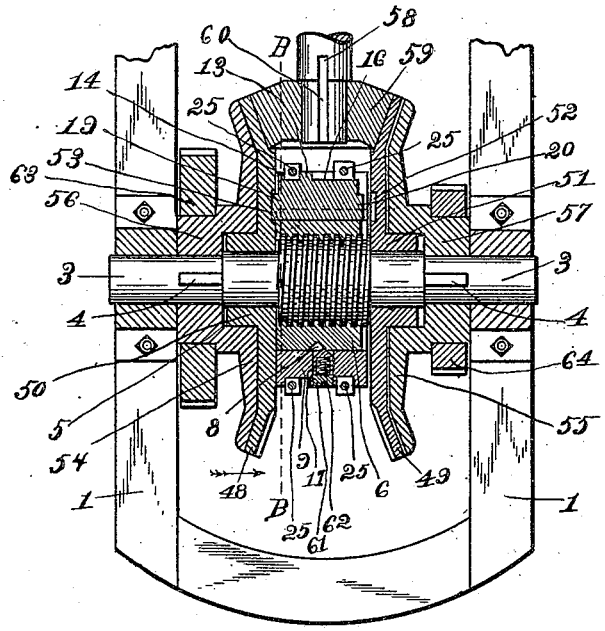
Figure 1:
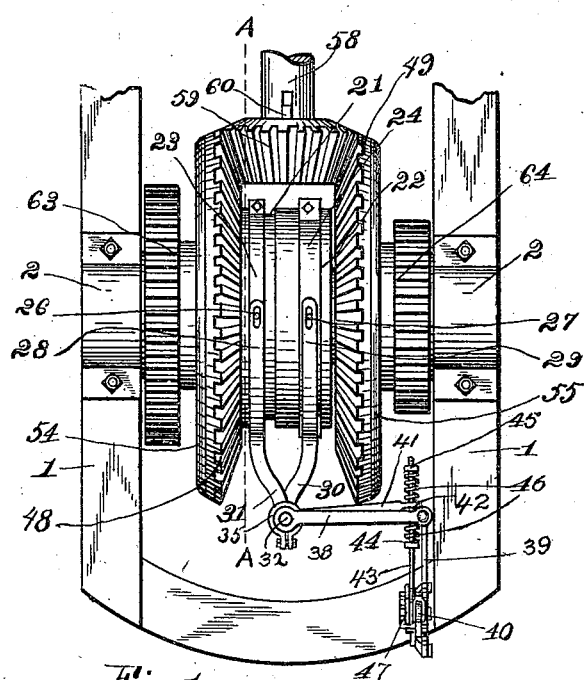

Figure 1 is a top plan view of the invention mounted on a suitable supporting-frame, disclosing the broken end of a power-transmitting shaft with a bevel-pinion rigidly secured to its inner end in engagement with and between two bevel cog-rimmed disks, also two irregular plain-faced disks, their faces adapted to conform to the outer faces of the cog-disks, also cog-rims rigidly secured to the hubs of said irregular-faced disks. The object of the cog-rims is for the further transmission of power, which will be fully described. Fig. 2 is a horizontal longitudinal sectional view of Fig. 1 except the shafts, which appear in plan. Fig. 3 is a vertical sectional view of my invention, excepting the pinion and the broken power-transmitting shaft and the means in part for manipulating the invention, which are in elevation, as shown, taken on lines with A A of Fig. 1 or B B of Fig. 2 looking in the direction of the pointing-arrows. Fig. 4 is an enlarged view of a ratchet-stand and the operating-levers, the same as seen at Fig. 3. Fig. 5 is an inside face view of one of two cog-rimmed disks, already referred to, with a recess or cavity in the face thereof, the object of which will be fully described. Fig. 6 is a key adapted to have lateral movement, which will also be fully described.

Having thus far briefly described my invention, I will now proceed to more fully describe it by referring to corresponding numerals on the drawings and specification, in which—

1 designates a suitable supporting-section of a frame which may be connected or may be made a part of the frame construction of a locomotive, engine, automobile, or other vehicles to which my power-transmitting machine may be applied. Oppositely arranged on the side bars of said frame are journal-seats 2, firmly bolted thereon, as shown. Horizontally supported on said seats is a shaft 3. Said shaft is correspondingly graduated or recessed each way from the middle, as shown. The central larger portion 5 of the shaft is screw-threaded. Engaging said portion is a circumferential collar 6, which is correspondingly internally screw-threaded and is provided with a peripheral external longitudinal recess or groove 7 and is further provided with a peripheral conical indentation 8 opposite to said groove. The object of this groove and the indentation will be fully described further on.

Telescopically engaging the collar 6 is an open circumferential collar 9. Said collar 9 is provided with a longitudinal opening 10, which is clearly noticeable at Fig. 3 and is adapted to correspondingly stand fair with or over the longitudinal groove 7 in collar 6. The open collar 9 is further provided with a round peripheral opening 11 central thereof and opposite to the longitudinal opening 10. The object of the longitudinal groove 7 and the corresponding opening 10 is to admit or be respectively engaged by a key 12. (Seen in detail at Fig. 6.) Said key is recessed, as shown, at each end and is provided with two upwardly-extending lugs 13 and 14, producing a recess 15 between the two and a continued surface 16 at the right of the lug 13, and for the purpose of further reference I will designate the recesses at the ends of said key 17 and 18 and the extending ends beyond the recesses 19 and 20.

The key 12 is adapted to engage snugly but loosely the groove 7 in the collar 6 and the opening 10 in the collar 9. Said collar 9 is provided with two circumferential peripheral recesses 21 and 22. Snugly and loosely engaging said recesses are circumferential bands 23 and 24. The bands are jointed, as indicated, by band 23 (seen at Fig. 3) and are held in position by means of bolts 25, as seen at Fig. 2. The upper ends of lugs 13 and 14 of key 12 when in position, as seen at Fig. 2, are adapted to stand flush with the peripheral face of collar 9, as seen also at Fig. 2. Pivotally secured to the peripheral bands 23 and 24, as indicated at 26 and 27, Fig. 1, are two semicircularly circumferentially disposed hooks or yokes 28 and 29, as seen in Fig. 1. Each is provided with rearwardly-extended portions 30 and 31. The extended portion 31 is rigidly secured to a vertical shaft 32 by means of clips 33 and 34. Telescopically supported on the upper portion of the vertical shaft 32 is a sleeve 35, which is adapted to have independent movement of said shaft 32. Rigidly secured to said sleeve 35 by means of clips 36 and 37 is the extended portions of yokes 30. Said shaft 32, over which sleeve 35 is mounted, may be supported in any suitable manner. Rigidly secured to the upper end of said shaft is a rocker-arm 38, that pivotally engages a connecting-rod 39 at right angles therewith. The outer end of said rod is pivotally secured to a hand-lever 40. Rigidly mounted on sleeve 35 is a rocker-arm 41, which is provided with a round opening 42 in the outer end. Loosely passing through said opening is the screw-threaded end of a rod 43, which is threaded a sufficient distance to receive corresponding screw-threaded nuts 44 and 45 on each side of the arm 41, as shown. Between the nuts and on each side of said arm are helical springs 46. The opposite end of the rod is pivotally secured to a hand-lever 47.

Loosely mounted on shaft 3 are two cog-rimmed disks 48 and 49, which stand face to face, as shown, and are provided with hubs 50 and 51 integral therewith and are further provided with recesses 52 and 53 in their inner faces. The location of one of these recesses is clearly indicated by numeral 52, (seen at Fig. 5,) and, further, rigidly mounted on said shaft 3 are two irregular-faced disks 54 and 55, which are provided with integral hubs 56 and 57, which are fixed upon shaft 3 by the keys 4.

Mounted on a broken shaft 58 is a pinion 59. Said pinion is adapted to engage the two cog-rimmed disks 48 and 49, as shown. The shaft 58 is adapted for the transmission of power from any power-producing source to my power-transmitting machine. The pinion 59 is made rigid to shaft 58 by means of a key 60. Inserted in the peripheral opening 11 of collar 9 is a hollow pin 61. The inner end is rounded or conical in configuration and is adapted to engage and disengage the conical indenture 8 in the periphery of collar 6. Said pin is actuated by a helical spring 62 in the bore thereof.

The hubs 56 and 57 of the irregular-faced disks are recessed at their outer ends, as shown. Rigidly secured on said hubs, respectively, are circumferential cog-rims 63 and 64. The object of these is for the further transmission of power to other machinery, and the object of the difference in the circumferential size is for transmitting different speeds to other machinery.

The operation of my invention is as follows: It is understood that the two cog-rimmed disks turn loosely on shaft 3 in opposite directions, and it will be noticed at Fig. 2 that cog-rim 48 closely impinges the irregular-faced disk 54 and that collar 6 and collar 9 closely impinge the inner face of said cog-rimmed disk, and the end 19 of key 12 stands in engagement with recess 53 in the face of said cog-rimmed disk 48. When in this position, all of the force exerted by the power-transmitting shaft 58 is brought to bear against the irregular-faced disk 54 in such a manner that unlimited power incident to the capacity of the power source is transmitted through cog-rim 63 to other machinery. The normal position of collars 6 and 9 and key 12 when my power-transmitting machine is idle is central between the two faces of the cog-rimmed disks 48 and 49, so as not to be closely impinged by either. It will be observed in Fig. 1 that the annular recess 21 at one end of collar 9 is of sufficient width to permit the ring 23 to be moved laterally without its moving the said collar. As this is the ring which actuates the key 12, the effect of this lateral freedom of motion of said ring is to permit the key 12 to be moved longitudinally relatively to the collar 9. Yoke 28 31, operated by hand-lever 40, controls the movements of the key 12. The other yoke 29 30, operated by hand-lever 47, controls the lateral movements of the outer collar 9. When the driven trains of gears (not shown) are both idle, the latches of levers 40 and 47 are in the center notches and the collars 9 and 6 are out of contact with either wheel 48 or 49. The drive-shaft 58 is supposed to be in rotation, thus rotating both of said wheels 48 and 49. When it is desired to start the train driven by the angular gear 63, (for example,) the operator moves lever 47 in the proper direction to cause collar 9 to be pressed against gear-wheel 48. This pressure sets up a light friction between wheel 48 and its friction-disk 54. The collar 9 and the inner threaded collar 6 (to which it is loosely keyed by key 12) will be started rotating by the rotation of wheel 48, and this rotation of the threaded collar 6 causes it to travel upon the screw 5 toward the wheel 48. Before said collar 6 has become tightly jammed against wheel 48 the operator moves the other lever 40 in the proper direction to cause the key 12 to be also shifted toward the wheel 48. The end of the key will thus be pressed against the face of said wheel, and as the key and the wheel will be revolving at different speeds the end of the key will more or less quickly register with recess 53, and when this occurs, the pressure on the key being continued by one of the aforesaid springs 46, the key will be pushed into said recess, and thereby any further slipping of collar 6 upon the inner face of gear-wheel 48 will be prevented. The pressure of collar 6 upon gear-wheel 48 is sufficient to cause the outer face of said wheel to be held tightly against the inner and fitting face of disk 54. This disk being virtually integral with annular gear 63, the power is frictionally transmitted to said annular gear. When the lever 47 is first moved to operative position, slippage will occur between gear-wheel 48 and its disk 54, and when the threaded collar 6 comes into contact with wheel 48 slippage may occur between these two members. The slippage between the faces of collar 6 and gear-wheel 48 is arrested as soon as the end of the key 12 enters the recess 53 in said wheel. The positions of the parts when the power is connected to annular gear 63 is shown in Fig. 2, (omitting the yokes and the operating-levers.) When the power is to be shifted to the other train of gears (not shown) at the opposite side of the machine, lever 40 is moved back to middle position, thereby retracting the key 12 from the recess. Then lever 47 is thrown over to reverse position, thereby drawing the outer collar 9 away from wheel 48 and pressing it against the opposite wheel 49. Thus the latter is pressed lightly against its friction-disk 55, and a slippage will occur between these members. The pressure is now increased by the operator grasping lever 40 and moving it in the proper direction to cause the key 12 to enter the recess 52 of wheel 49. In case the threaded collar 6 has not been started to reversely rotate by the application of collar 9 to wheel 49 it will be started by the engagement of the key with said recess, thus forming a positive drive between wheel 49 and collars 9 and 6. The latter now travels upon the screw, pushing wheel 49 into tight engagement with its disk 55, and as soon as the shaft 3 rotates at full speed of course the further tightening of the threaded collar 6 ceases. The power is now transmitted from pinion 59 to gear-wheel 49, to disk 55, to annular gear 64, thence to any driven mechanism. When the operating-levers are thrown back to neutral positions, the disengaged threaded collar 6 will in retreating from wheel 49 arrive at such a position that the spring-pressed pin 11 will enter the recess 8 in collar 9, and thereby collar 6 will be held out of contact with either wheel 48 or 49 until it is again forced to one side or the other by the action of the screw 5. The pressure upon yoke 28 31 and the collar 9 is not rigidly transmitted from the operating-lever 40, but through the intermediacy of one or the other of springs 46 on connecting-rod 43. Thus even after the lever 40 has been latched one of said springs exerts a yielding pressure upon the key 12 while the key is finding recess 52 or 53 in wheel 49 or 48.

Having now fully described my invention, what I claim as new, and desire to secure by Letters Patent of the United States, is—

1. In a power-transmitting machine a suitable supporting-frame, a graduated shaft having a screw-threaded central portion, a screw-threaded collar mounted on said screw-threaded portion, a pair of cog-rimmed disks loosely mounted on said graduated shaft, their inner faces adapted to be engaged by said screw-threaded collar, a pair of disks rigid with said shaft, their inner faces adapted to engage the outer faces of the cog-rimmed disks, a power-transmitting shaft, a cog-pinion rigid with said shaft and adapted to engage and mesh with the cog-rimmed disks, substantially as described.

2. In a power-transmitting machine of the character described, a supporting-frame, a graduated shaft carried by the frame having a screw-threaded central portion, a screw-threaded collar mounted upon the central portion of said shaft, an open collar arranged to telescopically engage the screw-threaded collar having a feathered connection therewith a pair of cog-rimmed disks loosely mounted on said shaft and arranged to be impinged by the screw-threaded collar, and the open collar, a pair of disks supported on said shaft and having their inner faces arranged to impinge the outer faces of said cog-rimmed disks, said cog-rimmed disks having a portion of their hubs arranged in recesses formed in the hubs of said second-mentioned disks, a power-transmitting shaft and a cog-pinion mounted on said shaft and arranged to engage said cog-rimmed disks, substantially as described.

3. In a power-transmitting machine a suitable supporting-frame, a graduated shaft having a screw-threaded portion central thereof, a screw-threaded collar mounted on said screw-threaded portion, said collar having a longitudinal groove, an open collar adapted to telescopically engage said screw-threaded collar, the opening thereof adapted to register with the groove in said screw-threaded collar, a key adapted to engage the opening in the collar, and the slot in the periphery of the screw-threaded collar, a pair of cog-rimmed disks loosely mounted on the shaft, a pair of irregular-faced disks rigid on said shaft, their inner faces adapted to impinge the outer faces of the cog-rimmed disks, a power-transmitting shaft, a pinion mounted on the inner end of said shaft and adapted to engage the cogs in the cog-rimmed disks, substantially as described.

4. In a power-transmitting machine, a supporting-frame, a graduated shaft mounted on the frame and having a screw-threaded central portion, a screw-threaded collar mounted on said portion, an open collar telescopically engaging said screw-threaded collar and having a feathered connection therewith, means for shifting said open collar on said screw-threaded collar, cog-rimmed disks loosely mounted on said shaft, their inner faces being arranged to be impinged by said collars, and a pair of disks rigidly mounted on said shaft and having the inner faces thereof arranged to engage the outer faces of the cog-rimmed disks.

5. In a power-transmitting machine of the character described, a graduated shaft, the central portion thereof being screw-threaded, a screw-threaded collar adapted to engage said screw-threaded portion, said collar having a longitudinal groove and a conical indentation, an open collar adapted to telescopically engage the screw-threaded collar, said collar having peripheral recesses and a round opening, a hollow spring-actuated pin adapted to engage said opening, the inner end thereof adapted to engage the indentation in the screw-threaded collar, a recessed key adapted to engage the groove in the screw-threaded collar, and the opening in the open collar circumferential bands engaging the recesses in the open collar and the recesses in the key, circumferentially-disposed yokes engaging said bands, and means for actuating said yokes, a pair of cog-rimmed disks loosely mounted on the shaft and adapted to engage the collars, irregular-faced disks adapted to frictionally engage the outer faces of said cog-rimmed disks, and means for transmitting power from a power source to the cog-rimmed disks, substantially as described.

In testimony whereof I affix my signature in the presence of two witnesses.

ENOCH PROUTY.

Witnesses:
   M. L. LANGE,
   R. E. HAMILTON.